(12) United States Patent
Simitsis et al.

(10) Patent No.: US 8,745,038 B2
(45) Date of Patent: Jun. 3, 2014

(54) OPTIMIZATION OF INTEGRATION FLOW PLANS

(75) Inventors: Alkiviadis Simitsis, Santa Clara, CA (US); William K. Wilkinson, Sunnyvale, CA (US); Umeshwar Dayal, Saratoga, CA (US); Maria G. Castellanos, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 859 days.

(21) Appl. No.: 12/712,943

(22) Filed: Feb. 25, 2010

(65) Prior Publication Data
US 2011/0209149 A1 Aug. 25, 2011

(51) Int. Cl.
*G06F 17/30* (2006.01)

(52) U.S. Cl.
USPC .............................. 707/719; 707/602; 707/674

(58) Field of Classification Search
USPC ........................................ 707/602, 674, 719
See application file for complete search history.

(56) References Cited

U.S. PATENT DOCUMENTS

| | | | |
|---|---|---|---|
| 6,567,802 B1 | 5/2003 | Popa et al. | |
| 6,754,652 B2 | 6/2004 | Bestgen et al. | |
| 7,089,225 B2 | 8/2006 | Li et al. | |
| 7,233,939 B1 | 6/2007 | Ziauddin | |
| 7,383,247 B2 | 6/2008 | Li et al. | |
| 7,574,424 B2 | 8/2009 | Chowdhuri | |
| 7,596,550 B2 | 9/2009 | Mordvinov et al. | |
| 7,689,582 B2 * | 3/2010 | Behnen et al. | 707/999.102 |

OTHER PUBLICATIONS

Boehm et al. ("Workload-Based Optimization of Integration Processes", Proceedings of the 17th ACM conference on Information and knowledge management, CIKM 2008).*
Apache Software Foundation, The, "Welcome to Apache Hadoop", Jul. 16, 2009, http://hadoop.apache.org, 2 pages.
Neil Conway, "CISC 499: Transactions and Data Stream Processing", Apr. 6, 2008, 28 pages.
Umeshwar Dayal et al., "Data Integration Flows for Business Intelligence", EDBT 2009, Mar. 24-26, 2009, Saint Petersburg, Russia, 11 pages.
Lukasz Golab et al., "Scheduling Updates in a Real-Time Stream Warehouse", ICDE 2009, pp. 1207-1210.
Kamal Hathi, "An Introduction to SQL Server 2005 Integration Services", Microsoft TechNet, May 1, 2005, Microsoft Corporation, 14 pages.
Joseph M. Hellerstein, "Optimization Techniques for Queries With Expensive Methods", ACM Transactions on Database Systems, vol. 23, No. 2, 1998, 41 pages.
IBM, "WebSphere DataStage", http://www-306.ibm.com/software/data/integration/datastage, 2007, IBM Corporation, Armonk, New York, 2 pages.

(Continued)

*Primary Examiner* — Cheryl Lewis

(57) ABSTRACT

Computer-based methods, computer-readable storage media and computer systems are provided for optimizing integration flow plans. An initial integration flow plan, one or more objectives and/or an objective function related to the one or more objectives may be received as input. A computing cost of the initial integration flow plan may be compared with the objective function. Using one or more heuristics, a set of close-to-optimal integration flow plans may be identified from all possible integration flow plans that are functionally equivalent to the initial integration flow plan. A close-to-optimal integration flow plan with a lowest computing cost may be selected from the set as a replacement for the initial integration flow plan.

20 Claims, 5 Drawing Sheets

(56) References Cited

OTHER PUBLICATIONS

Informatica, "Improve Operational Efficiency With a Single, Unified Platform for Enterprise Data Integration", 2009, Informatica Corporation, Redwood City, California, 2 pages.

Informatica, "Informatica PowerCenter—The Foundation of Enterprise Data Integration", Apr. 17, 2009, Informatica Corporation, Redwood City, California, 8 pages.

Neoklis Polyzotis, "Supporting Streaming Updates in an Active Data Warehouse", ICDE, 2007, 10 pages.

Alkis Simitsis et al., "Optimizing ETL Processes in Data Warehouses", ICDE 2005, Apr. 5-8, 2005, Tokyo, Japan, 12 pages.

Alkis Simitsis et al., "QoX-Driven ETL Design: Reducing the Cost of ETL Consulting Engagements", SIGMOD 2009, Jun. 29-Jul. 2, 2009, Providence, Rhode Island, 8 pages.

Alkis Simitsis et al., State-Space Optimization of ETL Workflows, IEEE Transactions on Knowledge and Data Engineering, vol. 17, No. 10, Oct. 2005, pp. 1404-1419.

Christian Thomsen et al., "RiTE: Providing On-Demand Data for Right-Time Data Warehousing", ICDE 2008, Apr. 7-12, 2008, Cancun, Mexico, 24 pages.

Richard Winter, BeyeNETWORK, "Why Are Data Warehouse Growing So Fast?", Apr. 10, 2008, Powell Media, LLC., 7 pages.

\* cited by examiner

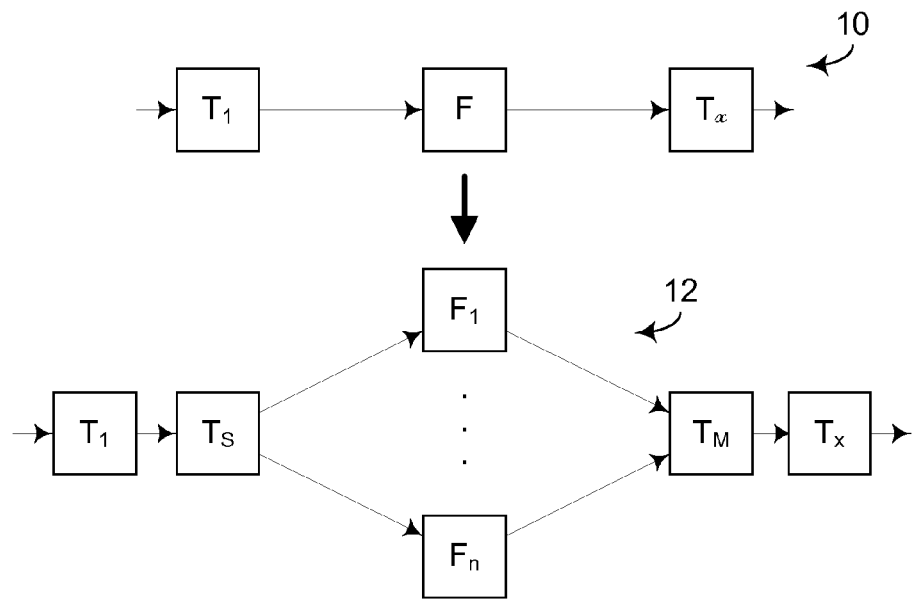
Fig. 1
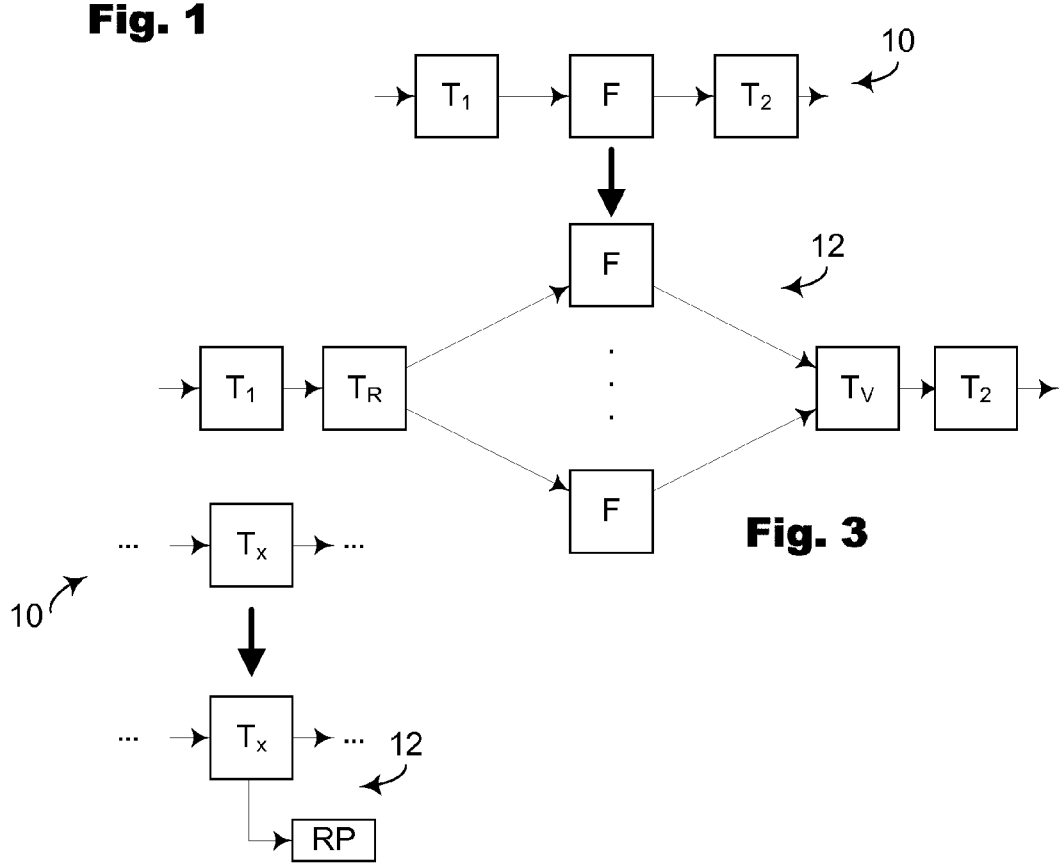
Fig. 3
Fig. 2

OPTIMIZATION OF INTEGRATION FLOW PLANS

BACKGROUND

When designing integration flow plans such as extract-transform-load ("ETL") processes, two objectives that are typically considered are correct functionality and adequate performance. Functional mappings from operational data sources to a data warehouse should be correct and an ETL process should complete within a certain time window. However, two other objectives that also may be considered by integration flow plan designers are fault tolerance (also referred to as "recoverability") and freshness. Fault tolerance relates to the number of failures that an integration plan can tolerate and still complete within a performance time window. Freshness relates to the latency between the occurrence of a business event at a source system and the reflection of that event in the target system (e.g., a data warehouse).

An integration flow plan should be fault-tolerant and yet still satisfy a freshness requirement to finish within a specified time window. One strategy that may be employed to make an integration flow plan fault tolerant is to repeat an integration flow plan in the event of a failure. However, repeating the entire integration flow plan may not be feasible if the dataset is large or the time window is short. Another way to make integration flow plans fault tolerant is by adding recovery points. A recovery point is a checkpoint of the integration flow plan state and/or a dataset snapshot at a fixed point in the flow. If a recovery point is placed at an operator, as a dataset is output from the operator, the integration flow plan state and/or the dataset may be copied to disk. If a failure occurs, flow control may return to this recovery point, the state and/or dataset may be recovered, and the integration flow plan may resume normally from that point. This may be faster than restarting the entire integration flow plan since operators prior to the recovery point are not repeated.

However, there may be a cost associated with recovery points. Inserting the recovery point may have a cost. Additionally, maintaining the recovery point may include recording state data and a dataset to disk, which requires additional overhead of disk I/O. Thus it may not be feasible to place recovery points after every operation in an integration flow plan. Accordingly, a designer may be required to decide where to insert recovery points in an integration flow plan.

Currently, this issue may be addressed largely based on the experience of the designer, e.g., one designer might place recovery points after every long-running operator. However, with complex flows and competing objectives there may be an enormous number of choices, and so design produced by a designer may not be optimal.

An exemplary approach is to formulate the placement of recovery points as an optimization problem where the goal is to obtain the best performance when there is no failure and the fastest average recovery time in the event of a failure. Given an integration flow plan with n operators, there are n−1 possible recovery points. Any subset of these n−1 recovery points is a candidate solution. Therefore, the search space is given by the total number of combinations of these n−1 recovery points:

$$totalRP = 2^{n-1} - 1$$

The cost of searching this space may be exponential where the number of operators is O(2n). The search space may be even larger if other strategies for fault tolerance are to be considered. In addition, the integration flow plan design may have other objectives that must be considered such as freshness, cost, and storage space. There also may be additional strategies to consider for improving performance, such as parallelism. These considerations may expand the search space to a size that is impracticable for a designer to search manually.

BRIEF DESCRIPTION OF THE DRAWINGS

FIG. 1 depicts schematically a partitioning transition of one or more operators in an integration flow plan into multiple parallel flows, according to an embodiment of the invention.

FIG. 2 depicts schematically a recovery point transition of an operator into an operator having a recovery point, according to an embodiment of the invention.

FIG. 3 depicts schematically a replication transition of an operator, according to an embodiment of the invention.

DETAILED DESCRIPTION

Figure 4:
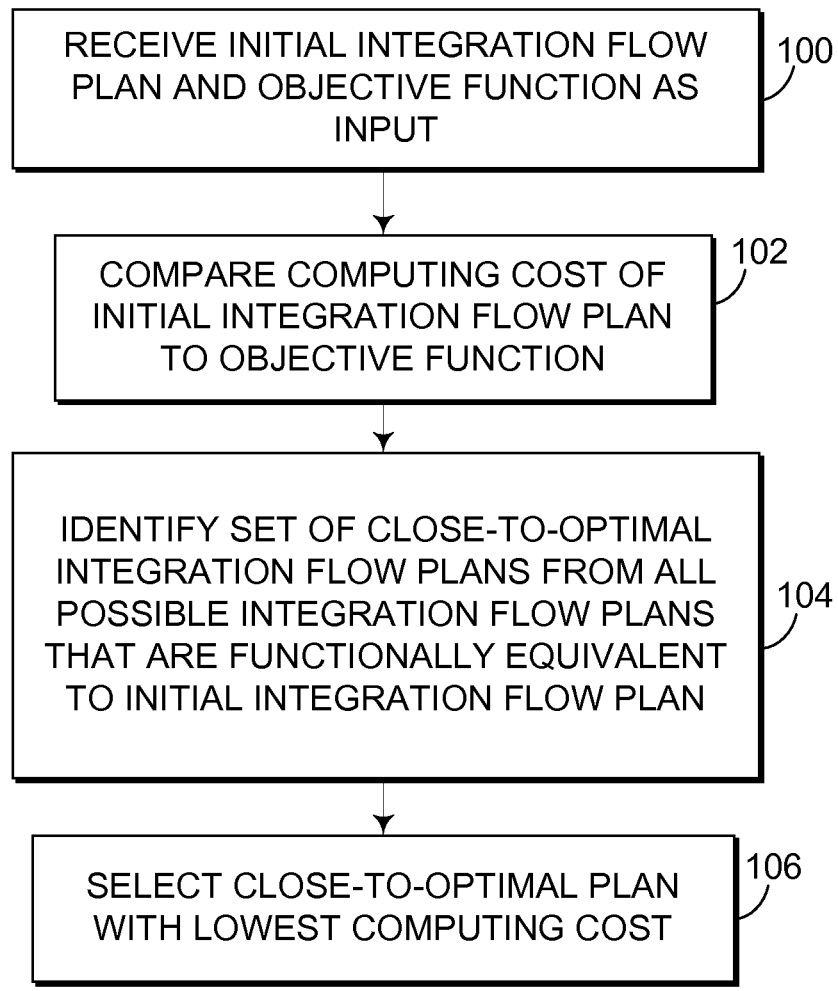
FIG. 4 depicts an example process of optimizing an initial integration flow plan, according to an embodiment of the invention.

Computer-based methods, computer-readable storage media and computer systems are provided for optimizing integration flow plans. An integration flow plan, such as an ETL plan, may be received as input, along with other information about performance objectives (e.g., freshness, fault tolerance). A computing cost of the initial integration flow plan may be computed to determine whether it satisfies an objective function related to these objectives. If the initial integration flow plan's computing cost does not satisfy the objective function, a set of all integration plans that are functionally equivalent to the initial integration flow plan may be searched. An integration plan having a lower computing cost than the initial integration flow plan may then be selected from the set as a replacement for the initial integration flow plan.

As used herein, the term "transition" refers to a transformation of an integration flow plan $G_1$ into a functionally equivalent integration flow plan $G_2$. Two integration flow plans are functionally equivalent where they produce the same output, given the same input. Various transitions and combinations of transitions may be used on a query plan to improve the plan's performance. There may be a large number of transitions that may be applied to a given integration flow plan, particularly where the plan is complex and includes numerous operators.

One exemplary transition is swap $(T_1, T_2)$. This transition may be applied to a pair of unary (i.e. having a single output) operators, $T_1$ and $T_2$, occurring in adjacent positions in an integration flow plan $G_1$. Swap may produce a new integration flow plan $G_2$ in which the positions of $T_1$ and $T_2$ have been interchanged.

Compose $(T_{1,2}, T_1, T_2)$ and decompose $(T_{1,2}, T_1, T_2)$ is another exemplary pair of transitions that may be used to combine and split, respectively, the operations of two operators. Compose replaces adjacent unary operators, $T_1$ and $T_2$, with a single unary node $T_{1,2}$ that performs the composition of the functions of $T_1$ and $T_2$. Decompose has the inverse effect of replacing a unary node T with two adjacent unary operators, $T_1$ and $T_2$, whose composition produces the same output as T.

Other exemplary transitions include factorize ($T_b$, $T_1$, $T_2$, T) and distribute ($T_b$, $T_1$, $T_2$, T). Each of these transitions interchanges the positions of a binary (i.e., having two or more outputs) operator $T_b$ and a pair of unary operators, $T_1$ and $T_2$. Factorize replaces two unary operators, $T_1$ and $T_2$, with a single node T that performs the same function, and places T immediately after $T_b$ in the flow. Distribute is the "inverse" of factorize, and replaces T with two functionally equivalent operators, $T_1$ and $T_2$, and moves them immediately before $T_b$ in the flow.

Other types of transitions may be targeted specifically towards the objectives of freshness and fault tolerance. For example, partitioning creates multiple, independent instances of an integration flow plan (or a portion thereof) on separate processors where each instance processes a different subset of the input. Referring to FIG. 1, partition ($T_1$, $T_x$, d, P) may be used to inject partitioned parallelism into an initial integration flow plan 10. Partition splits a section of initial integration flow plan 10 between $T_1$ and $T_x$ into d (d=degree of parallelism) streams based on a partitioning policy P by inserting a splitter node $T_s$ after $T_1$ and a merger node $T_M$ before $T_x$. The result is partitioned plan 12. The partitioning policy P may dictate which of the n streams an incoming tuple may be sent through. Any number of different partitioning policies, such as range, hash, or round-robin, may be employed without affecting operation of the integration flow plan so long as the partitioning policy guarantees that the union of the set of tuples directed through the n streams is equal to the output of $T_1$.

For a partitioning transition to be applicable to an integration flow plan, the resulting flow plan should be functionally equivalent to the original. This may require that the operations occurring in the flow between $T_1$ and $T_x$ be distributive over union, filter, join, and surrogate-key transformations. Other operations, such as grouping, sorting, non-distributive aggregates and some user-defined functions may require modification of the operations in the flow followed by post-processing in the merger operation.

Another exemplary transition that targets fault tolerance and freshness is add_recovery_point ($T_x$, RP), which shown in FIG. 2. Add_recovery_point ($T_x$, RP) transitions an initial integration flow plan 10 (or a portion thereof) into a functionally equivalent integration flow plan 12 by creating a new recordset node RP at position x. A recordset represents any type of data store, such as a relational table, a flat file, an xml file, and so forth. A recordset node may be configured to retain a recordset that has flowed through the plan up to the point. Thus, the recovery point RP may be a point in the integration flow plan where the state of the data flow is made durable, so that it can be used to recover from failures. Adding a recovery point does not change the semantics of the integration flow plan, and hence the new flow produced by this transition is functionally equivalent to the original flow.

Recovery points may be synchronous or asynchronous, corresponding roughly to consistent and fuzzy checkpoints, respectively, in a database management system. A synchronous recovery point may be a blocking operation (i.e. an operator that must complete processing of a set of data before that data may be processed by a downstream operator) that creates a complete snapshot of the integration flow process state at a given point in the flow. An asynchronous recovery point, on the other hand, may log the state of the integration flow plan at a given point in the flow but may not block the flow of data through an integration flow plan. An asynchronous recovery point may have less associated latency but recovery may be more computationally expensive than for a synchronous recovery point.

Replicate ($T_1$, $T_2$, n) is a transition that may be used to target fault tolerance. An example is shown in FIG. 3 where another initial integration flow plan 10 (or a portion thereof) is transitioned to a functionally equivalent integration flow plan 12. A replicator operator $T_R$ may be introduced after operator $T_1$ and before one or more operators F, and a voter operator $T_V$ may be introduced after the one or more operators F and before operator $T_2$. The replicator operator $T_R$ may cause n copies of F to execute between $T_1$ and $T_2$. The voter operator $T_V$ may tally the copies of the tuples received from the replicated Fs and produce as output tuples forming the majority. Replication does not change the semantics of the operations $T_1$ and $T_2$, and hence the new flow produced by this transition may be functionally equivalent to the original flow.

Referring now to FIG. 4, an exemplary computer-based method of optimizing an integration flow is shown. These steps may be performed by one or more processors of one or more computer systems. Although the steps are shown in a particular sequence, this is not meant to be limiting. The sequence of steps may be altered, and one or more steps may be omitted altogether.

At step 100, an initial integration flow plan and an objective function may be received as input. These may be input by a user using one or more of a keyboard, mouse and other similar computer input devices. The initial integration flow plan may be in the form of a graph that includes one or more operators or "transformations," T, and recordsets, R, interconnected with each other to form a directed acyclic graph ("DAG").

The objective function may be a goal to be satisfied by an output integration plan, whether the integration flow plan that is ultimately output is the initial integration flow plan or a functionally equivalent integration flow plan. Any number of objectives or performance requirements may be considered when optimizing an integration flow plan, including performance, fault tolerance and freshness, and these objectives may be used in forming the objective function. The objective function may incorporate a separately input list of requirements, or the list of requirements may be input as part of the objective function.

The list of requirements may include a time window w for running or executing the integration flow plan. For example, if data in a data warehouse needs to be updated every 4 hours, then the ETL process in charge of gathering data from various disparate data sources and populating the data warehouse may have a time window w equal to 4 hours. A fault tolerance requirement may dictate the number of failures k that the integration flow plan can tolerate and still complete execution within the time window w. Fault tolerance may be at least in part dependent on the anticipated size of the input recordset.

Let n be the input recordset size, w be the execution time window for the integration flow plan process F, and k be the number of faults that must be tolerated. Then the integration flow plan may have the following constraint:

$$\text{Time}(F(n,k)) < w$$

In other words, the time required to process n tuples with up to k failures must be less than the time window w. Accordingly, an exemplary objective function that may be used as input in the method of FIG. 4 may be to find the integration flow plan F with the lowest computing cost that satisfies the above restraint. Put another way:

$$OF(F,n,k,w): \text{minimize } C_t(F) \text{ where } \text{Time}(F(n,k)) < w$$

Referring back to FIG. 4, at step 102, a computing cost of the initial integration flow plan (e.g., memory or CPU cycles or time required) may be compared with the objective function. If the initial integration flow plan satisfies the objective function (e.g., the initial integration flow plan is already optimal), the optimizing method may end. However, if the initial integration flow plan does not satisfy the objective function, (i.e. there is a functionally equivalent integration flow plan with a lower computing cost), then the method may proceed forward.

At step 104, using one or more heuristics, a set of close-to-optimal integration flow plans may be identified from all possible integration flow plans that are functionally equivalent to the initial integration flow plan. The identified set of close-to-optimal integration flow plans may be recorded in computer memory. Exhaustively searching all possible integration flow plans that are functionally equivalent to the initial integration flow plan may be impractical. Accordingly, heuristics may be used as will be described below to prune the search space of all possible integration flow plans that are functionally equivalent to an initial integration flow plan.

Various types of heuristics may be used to effectively prune the search space of all possible integration flow plans that are functionally equivalent to an initial integration flow plan. Some heuristics are related to performance. The following are examples of performance heuristics:

Operator pushdown: move more restrictive operators towards the start of the integration flow plan to reduce the data volume. For example, rather than extract→surrogate key generate→filter, do extract→filter→surrogate key generate.

Operator grouping: place pipelining operators together and separately from blocking operators. For example, rather than filter→sort→filter→function→group, do filter→filter→function→sort→group.

Pipeline parallelism: Place adjacent operators on separate physical processors and execute them in parallel with tuple data flow going from the producer operator to the consumer operator. For example, in the flow filter1→filter2, assign the filter1 and filter2 operators to run on separate processors so they execute concurrently, and have the output from filter1 flow to the input of filter2.

Partition parallelism: As shown in FIG. 1 and described above with regard to the partition transition, partition parallelism creates multiple, independent instances of an integration flow plan (or a portion thereof) on separate processors where each instance processes a different subset of the input. For instance, given a flow lookup→filter→sort, produce a new flow split(n)→lookup→filter→sort→merge(n) where split(n) splits the data into n streams, merge(n) combines the streams, and the substreams are processed on separate processors in parallel. Partitioned parallelism may improve the freshness of data by reducing the execution time of the integration flow plan, and may be particularly effective where the overhead of split(n) and merge(n) is low.

Split-point placement: Given a flow to be partitioned, a candidate split point may be inserted before a blocking operator. The blocking operator may then have less data to process when run in parallel, making it more efficient.

Merge-point placement. Given a flow to be partitioned, a candidate merge point may be inserted after a large data reduction operator (e.g., highly selective filter or aggregate), since merging is faster when there is less data to merge.

Other heuristics are targeted towards fault tolerance/recoverability. The following are some examples:

Blocking recovery point: Insert recovery points after blocking operators or, in general, any time-consuming operator.

Phase recovery point: Insert recovery points at the end of an integration flow phase. For example, a recovery point may be inserted in an integration flow plan at a point after data is extracted from disparate data sources or transformed from one format to another.

Recovery feasibility: Adding a recovery point at position x should take under consideration whether the cost of repeating operators T scheduled up to and including position $$x, \sum_{i=1}^{x} C_{Ti},$$

would be less than an expected cost $C_{RPx}$ of maintaining a recovery point at position x. In other words, if having a recovery point at a particular position would be more costly than re-executing the steps of the integration flow plan leading up to that position, then inserting a recovery point may not be worthwhile.

In addition to performance and fault tolerance heuristics, there are also reliability heuristics. An example of a reliability heuristic is reliable freshness. If a flow requires very fresh data—for instance, where the execution time window w is small—and if the flow also requires high reliability—for instance, the number of failures k that must be tolerated is high—recovery points may not be suitable due to their additional latency. In such a situation, redundant flows (e.g., using the replication transition) may be preferred.

Referring back to FIG. 4, once a set of close-to-optimal integration flow plans is identified using one or more of the above heuristics at step 104, at step 106, an integration flow plan having a lowest computing cost may be selected from the identified set as a replacement for the initial integration flow plan.

Figure 5A:
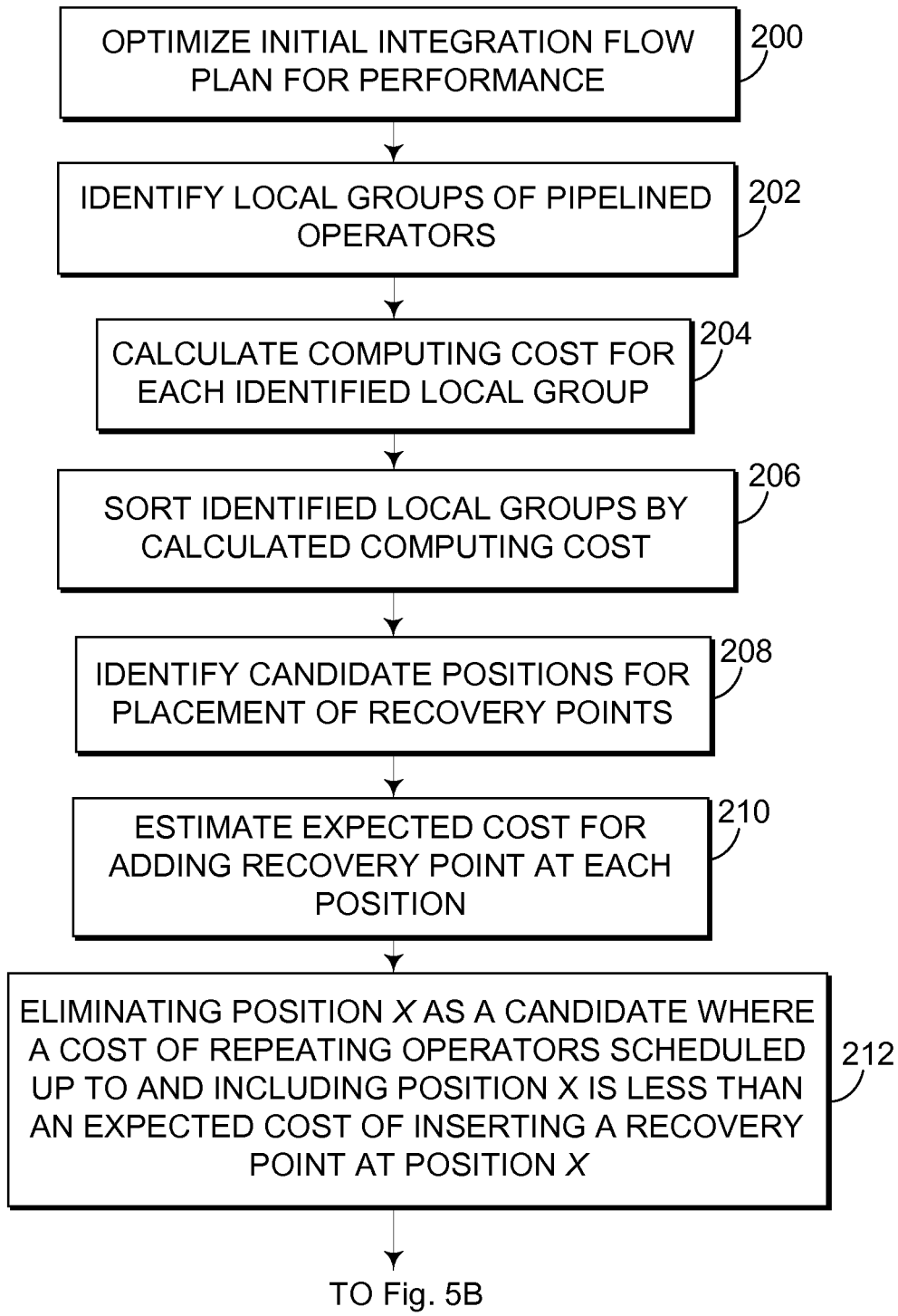
FIGS. 5A and B depict exemplary steps for pruning a search space of integration flow plans that are functionally equivalent to the initial integration flow plan using heuristics described herein, according to an embodiment of the invention.
Figure 5B:
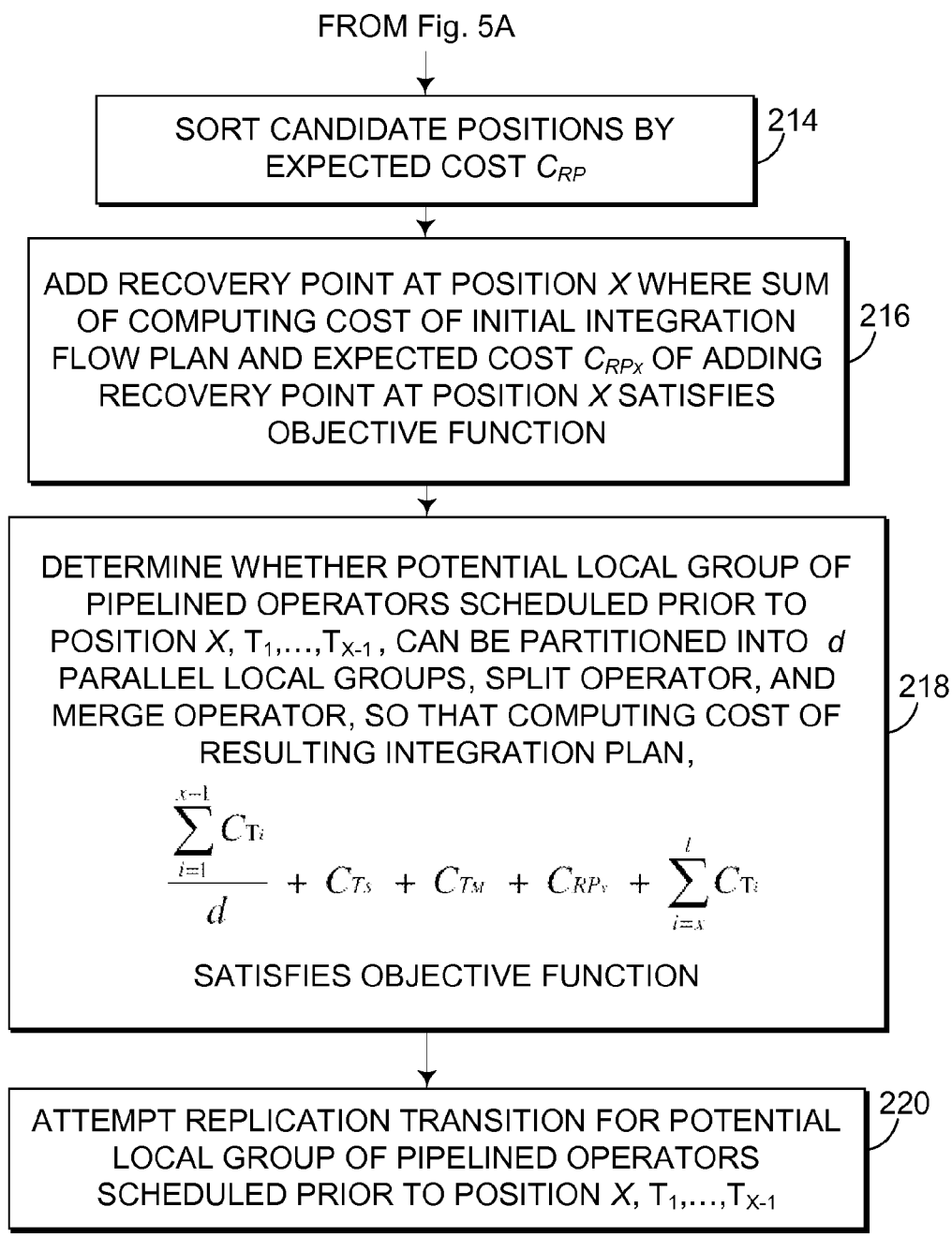

Exemplary Heuristic Search:

FIGS. 5A and 5B depict exemplary steps for identifying a set of close-to-optimal integration flow plans from all possible integration flow plans that are functionally equivalent to an initial integration flow plan, as shown in FIG. 4 at step 104. These steps may effectively prune the search space of all possible functionally equivalent integration flows, avoiding an exhaustive search. Each potential functionally equivalent integration flow plan identified may be stored in list candidates, which may also include the initial integration flow plan.

The first action taken may be to optimize the initial integration flow plan for performance at step 200. Optimizing for performance may include using various algebraic optimization techniques for performing operator pushdown, as described above. For example, chains of unary operators may be created before or after binary operators (i.e., operators having more than one output) to ensure that the most selective operators are pushed to the front of the design when possible.

At step 202, potential local groups lp of pipelined operators may be identified from all possible integration flow plans and placed in a list $Q_{lp}$). At step 204, a computing cost $C_{lpi}$ of each $lp_i$ may be calculated, and the list may be sorted by $C_{lpi}$ in memory at step 206.

At step 208, candidate positions may be identified within the initial integration flow plan for placement of recovery points. These candidate positions may be chosen at least in part using the blocking recovery point and phase recovery point heuristics described above. They may also be chosen based on an expected cost $C_{RP}$ for maintaining a recovery point at each position, which may be estimated at step 210. An expected cost $C_{RP}$ for maintaining a recovery point may be estimated for a data volume of n tuples as $$C_{RP} = \frac{C_{i/o}}{z_p} \times n,$$

where $C_{i/o}$ is the cost of writing one page of size $z_p$ to disk.

A position may be eliminated as a candidate for addition of a recovery point where the costs associated with having a recovery point at that position outweighs the benefits. For example, a position x may be eliminated as a candidate for placement of a recovery point at step 212 where a cost of repeating operators T scheduled up to and including position $$x, \sum_{i=1}^{x} C_{Ti},$$

is less than an expected cost $C_{RPx}$. A list $Q_{RP}$ of recovery points satisfying this condition may be formed and sorted by the calculated expected costs at step 214 (FIG. 5B). Because $Q_{RP}$ may be sorted in decreasing order of the expected cost, the most promising recovery points may be examined first.

Next, the recovery points stored in $Q_{RP}$ may be examined to determine whether a sum of the computing cost of the initial integration flow plan and the expected cost $C_{RPx}$ of adding a recovery point at position x satisfies the objective function. If the answer is yes, then a recovery point may be added at position x at step 216.

However, if adding a recovery point at a particular position x would cause the resulting integration flow plan to not satisfy the objective function, a determination may be made at step 218 as to whether a potential local group of pipelined operators $T_1, \ldots, T_{x-1}$ scheduled prior to position x can be partitioned into d parallel local groups, a split operator $T_S$, and a merge operator $T_M$, so that a computing cost of a resulting integration plan, $$\frac{\sum_{i=1}^{x-1} C_{Ti}}{d} + C_{TS} + C_{TM} + C_{RPx} + \sum_{i=x}^{l} C_{Ti},$$

satisfies the objective function.

Each local group $lp_i$ in $Q_{lp}$, scheduled prior to position x may be considered in step 218. For each such $lp_i$, possible partitioning schemes may be examined using a partitioning policy P and various degrees of parallelism d. An appropriate degree of parallelism d may be chosen so that partitioning will make insertion of a recovery point at position x possible while still satisfying the objective function. The cost of merging at the end of $lp_i$ may dictate an upper bound for d (i.e. if d is too large, then a cost of merging d streams may be too high). If a satisfactory d cannot be found, then another $lp_i$ may be examined. If no $lp_i$ allows the addition of the recovery point under consideration, then either a different recovery point may be examined, or replication may be attempted instead at step 220.

Various numbers $r_N$ of replicas may be considered for each chain $lp_i$. Odd integer values of $r_N$ may be considered because the voter operator V may choose output based on the majority of votes. Depending on desired accuracy of the results, either a fast or accurate voter operator V may be selected.

If replication fails, then integration flow plans having the recovery point under consideration may not be usable to replace the initial integration flow plan. Instead, the next available recovery point in $Q_{RP}$ may be considered.

Each time a suitable integration flow plan is found, it may be added to the list of candidates. Once the list is complete, the candidate having the lowest computing cost may be selected to replace the initial integration flow plan, as shown in FIG. 4 at step 106.

Figure 6:
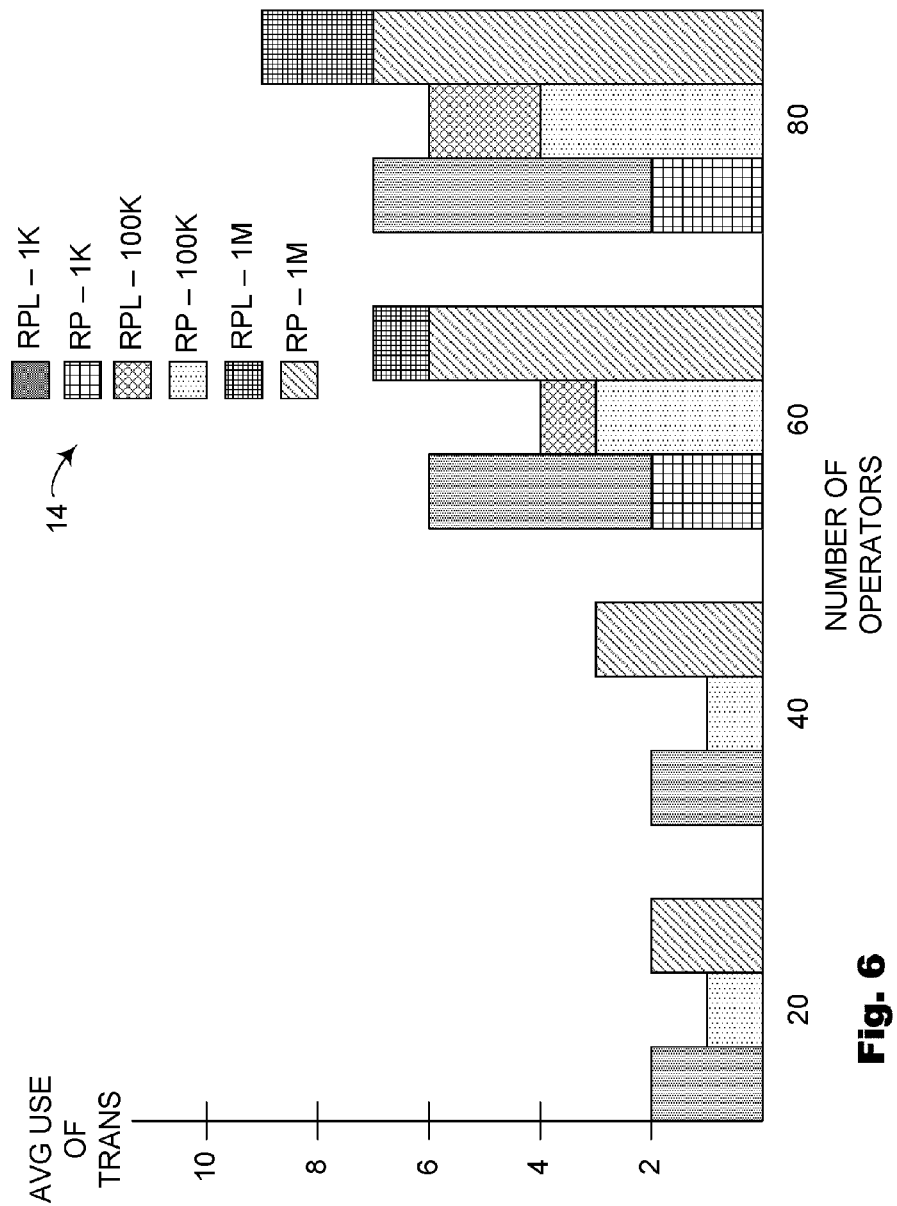
FIG. 6 is a chart showing exemplary numbers of recovery point and replication transitions that may be used with near-optimal integration flow plans having various numbers of operators and with various input sizes, according to an embodiment of the invention.

FIG. 6 is a chart showing optimal numbers of recovery point (labeled "RP") and replication (labeled "RPL") transitions used on randomly selected integration flow plans having various numbers of operators, and with various input sizes (1,000 tuples, 100,000 tuples and 1,000,000 tuples as indicated at legend 14). Partitioning is not considered in this example. These results are not limiting in any way, and may have been different had different integration plans been examined.

With smaller input sizes, replication tended to be more effective at optimizing the integration flow plan, presumably because the additional latency due to recovery points would not allow the integration flow plan to complete within its time window w. However, with larger input sizes, insertion of recovery points tends to be more effective at optimizing the integration flow plan. As the flow size increases up to 80 operators, optimal solutions tend to utilize a mixture of transitions, with recovery points interspersed with flows that are replicated.

For example, an integration flow plan having 20 operators that is provided with an input of 1,000 tuples may be optimized using two replication transitions and no recovery points. In contrast, an integration flow plan having the same number of operators and an input size of 1 million tuples may be optimized by the insertion of two recovery points; no replication is utilized.

Likewise, an integration flow plan having 80 operators that is provided with an input of 1,000 tuples may be optimized using five replication transitions and two recovery points. In contrast, an integration flow plan having the same number of operators and an input size of 1 million tuples may be optimized by the insertion of seven recovery points and two replication transitions.

The disclosure set forth above may encompass multiple distinct embodiments with independent utility. The specific embodiments disclosed and illustrated herein are not to be considered in a limiting sense, because numerous variations are possible. The subject matter of this disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether directed to a different embodiment or to the same embodiment, and whether broader, narrower, equal, or different in scope to the original claims, also are regarded as included within the subject matter of the present disclosure.

Where the claims recite "a" or "a first" element or the equivalent thereof, such claims include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

We claim:

1. A computer-based method of optimizing an integration flow plan on a computing system, comprising:
- receiving as input an initial integration flow plan and an objective function related to at least one of freshness and fault tolerance;
- comparing a computing cost of the initial integration flow plan with the objective function;
- identifying a set of close-to-optimal integration flow plans from all possible integration flow plans that are functionally equivalent to the initial integration flow plan using one or more heuristics; and
- selecting from the set a close-to-optimal integration flow plan with a lowest computing cost as a replacement for the initial integration flow plan.

2. The method of claim 1, further comprising identifying potential local groups of pipelined operators from all possible integration flow plans.

3. The method of claim 2, further comprising:
- calculating a computing cost of each identified potential local group of pipelined operators; and
- sorting the identified potential local groups of pipelined operators in memory by computing cost.

4. The method of claim 1, further comprising identifying candidate positions within the initial integration flow plan for placement of recovery points.

5. The method of claim 4, further comprising estimating an expected cost $C_{RP}$ for adding a recovery point at each position.

6. The method of claim 5, further comprising eliminating position x as a candidate where a cost of repeating operators T scheduled up to and including position $$x, \sum_{i=1}^{x} C_{Ti},$$

is less than an expected cost $C_{RPx}$.

7. The method of claim 5, further comprising sorting the candidate positions by expected cost $C_{RP}$.

8. The method of claim 7, further comprising adding a recovery point at position x where a sum of the computing cost of the initial flow plan and the expected cost $C_{RPx}$ of adding a recovery point at position x satisfies the objective function.

9. The method of claim 8, further comprising determining whether a potential local group of pipelined operators $T_1, \ldots, T_{x-1}$ scheduled prior to position x can be partitioned into d parallel local groups, a split operator $T_S$, and a merge operator $T_M$, so that a computing cost of a resulting integration plan, $$\frac{\sum_{i=1}^{x-1} C_{Ti}}{d} + C_{Ts} + C_{TM} + C_{RPx} + \sum_{i=x}^{t} C_{Ti},$$

satisfies the objective function.

10. A computer-readable storage medium having computer-executable instructions for optimizing an extract, transform and load ("ETL") plan, the instructions causing a computer to perform steps comprising:
- receiving as input an initial ETL plan and an objective function;
- comparing a computing cost of the initial ETL plan with the objective function;
- identifying a second ETL plan that is functionally equivalent to the initial ETL plan and that has a lower computing cost by performing one or more of a group of transitions consisting of partitioning, adding a recovery point and replication.

11. The computer-readable storage medium of claim 10, further including computer-executable instructions for:
- identifying local groups of pipelined operators from a set of all possible ETL plans that are functionally equivalent to the initial ETL plan,
- calculating a computing cost of each identified local group of pipelined operators; and
- sorting the identified local groups of pipelined operators in memory by computing cost.

12. The computer-readable storage medium of claim 11, further including computer-executable instructions for identifying candidate positions within the initial ETL plan for placement of recovery points.

13. The computer-readable storage medium of claim 12, further including computer-executable instructions for estimating an expected cost $C_{RP}$ for adding a recovery point at each position.

14. The computer-readable storage medium of claim 13, further including computer-executable instructions for eliminating position x as a candidate where a cost of repeating operators T scheduled up to and including position $$x, \sum_{i=1}^{x} C_{Ti},$$

is less than an expected cost $C_{RPx}$.

15. The computer-readable storage medium of claim 14, further including computer-executable instructions for sorting the candidate positions by expected cost $C_{RP}$.

16. The computer-readable storage medium of claim 15, further including computer-executable instructions for adding a recovery point at position y where a sum of the computing cost of the initial ETL plan and an expected cost $C_{RPy}$ of adding a recovery point at position y satisfies the objective function.

17. The computer-readable storage medium of claim 16, further including computer-executable instructions for determining whether an identified local group of pipelined operators $T_1, \ldots, T_{y-1}$ scheduled prior to position y can be partitioned into d parallel local groups, a split operator $T_S$, and a merge operator $T_M$, so that a computing cost of a resulting integration plan, $$\frac{\sum_{i=1}^{y-1} C_{Ti}}{d} + C_{Ts} + C_{TM} + C_{RPy} + \sum_{i=y}^{t} C_{Ti},$$

satisfies the objective function.

18. A computer system configured for integration flow plan optimization, comprising:
- means for receiving as input an initial integration flow plan and an objective function related to at least one of freshness and fault tolerance;
- means for comparing a computing cost of the initial integration flow plan with the objective function;

means for selecting a set of close-to-optimal integration flow plans from all possible integration flow plans that are functionally equivalent to the initial integration flow plan; and means for selecting from the set a close-to-optimal integration flow plan with the lowest computing cost as a replacement for the initial integration flow plan.

19. The computer system of claim 18, further comprising:

means for estimating an expected cost $C_{RP}$ for adding a recovery point at each position of the initial integration flow plan; and means for eliminating position x as a candidate for insertion of a recovery point where a cost of repeating operators T scheduled up to and including position $$x, \sum_{i=1}^{x} C_{Ti},$$

is less than the expected cost $C_{RPx}$.

20. The computer system of claim 19, further comprising means for adding a recovery point at position y where a sum of the computing cost of the initial flow plan and the expected cost $C_{RPy}$ of adding a recovery point at position x satisfies the objective function; and means for determining whether a potential local group of pipelined operators $T_1, \ldots, T_{y-1}$ scheduled prior to position y can be partitioned into d parallel local groups, a split operator $T_S$, and a merge operator $T_M$, so that a computing cost of a resulting integration plan, $$\frac{\sum_{i=1}^{y-1} C_{Ti}}{d} + C_{Ts} + C_{TM} + C_{RPy} + \sum_{i=y}^{l} C_{Ti},$$

satisfies the objective function.

* * * * *

UNITED STATES PATENT AND TRADEMARK OFFICE
CERTIFICATE OF CORRECTION

PATENT NO.       : 8,745,038 B2
APPLICATION NO.  : 12/712943
DATED            : June 3, 2014
INVENTOR(S)      : Alkiviadis Simitsis et al.

It is certified that error appears in the above-identified patent and that said Letters Patent is hereby corrected as shown below:

In the Claims

In column 9, line 45, in Claim 8, delete "$C_{RPx}$of" and insert -- $C_{RPx}$ of --, therefor.

In column 10, line 24, in Claim 13, delete "$C_{RP}$for" and insert -- $C_{RP}$ for --, therefor.

In column 10, line 43, in Claim 16, delete "$C_{RPy}$of" and insert -- $C_{RPy}$ of --, therefor.

In column 12, line 4, in Claim 20, delete "$C_{RPy}$of" and insert -- $C_{RPy}$ of --, therefor.

Signed and Sealed this
Eighteenth Day of November, 2014

Michelle K. Lee
*Deputy Director of the United States Patent and Trademark Office*